United States Patent Office 3,177,061
Patented Apr. 6, 1965

3,177,061
CARBAMIC ESTERS
Jean Métivier, Arpajon, France, assignor to Rhone-Poulenc S.A., Paris, France, a corporation of France
No Drawing. Filed Oct. 4, 1962, Ser. No. 228,243
Claims priority, application France, Nov. 17, 1959, 810,319, Patent 1,249,434; Aug. 5, 1960, 835,108, Patent 1,249,434
9 Claims. (Cl. 71—2.6)

This invention relates to new carbamic esters, to processes for their preparation, and herbicidal compositions containing them.

According to the present invention, there are provided the racemic and optically active D forms of the new carbamic esters of the general formula:

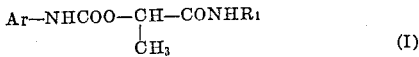
(I)

wherein Ar represents a phenyl or chloro-substituted phenyl group and $R_1$ represents an alkyl group containing 1 to 4 carbon atoms.

In "Science," volume 120, at page 263, issue of August 13, 1954, Mitchell et al. discuss the herbicidal activity of certain acids, e.g., those of the formula:

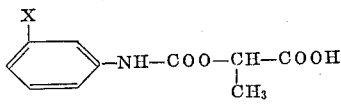

where X is hydrogen or chlorine. In British Patent No. 789,445 reference is made to acids of the general formula:

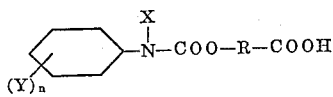

where the ring shown is a phenyl ring, Y may be halogen, X may be hydrogen and R may be an alkylene group. The said British patent also refers to the amides of the said acids, i.e., to corresponding compounds in which the terminal group is —CONH₂.

The compounds of the present invention, of general Formula I above, are not suggested in either of these references. They are, specifically, mono alkyl substituted amides of substituted propionic acid. It has been found that the very narrow group of compounds embraced within Formula I and being the racemic or optically active D forms thereof are outstandingly useful herbicidal agents as compared with the prior art compounds referred to above, as shown by comparative data set forth later herein.

The racemic and optically active D forms of the compounds of Formula I may be obtained by reacting an aryl isocyanate of the formula Ar—NCO with the racemic or optically active D form of a hydroxyamide of the general formula:

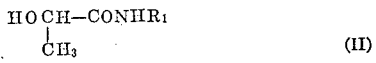
(II)

wherein the various symbols are as hereinbefore defined. The reaction is preferably carried out in an inert organic solvent medium, preferably an aromatic hydrocarbon such as benzene, and at a temperature between 15° and 150° C.

The racemic and optically active D forms of the compounds of general Formula I may also be prepared by reacting an amine of the formula H₂NR₁ with the racemic or optically active D form of a compound of the formula:

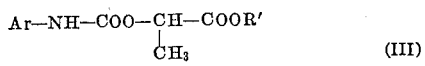
(III)

wherein R' represents an alkyl group of 1 to 4 carbon atoms and the other symbols are as hereinbefore defined. The reaction is preferably carried out in an inert organic diluent, for example, an alcohol, at room temperature (e.g., about 15° to 20° C.).

The starting materials of general Formula III may themselves be prepared by the reaction of an isocyanate of the formula Ar—NCO with an ester of a racemic or optically active D form of a hydroxy acid of the general formula:

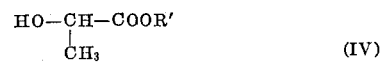
(IV)

wherein the various symbols are as hereinbefore defined.

The racemic and optically active D forms of the compounds of general Formula I may also be prepared by reacting an arylamine of the formula Ar—NH₂ with the racemic or optically active D form of a halogenoformate of the general formula:

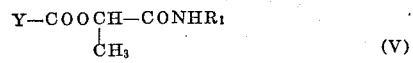
(V)

wherein Y represents a halogen atom, and the other symbols are as hereinbefore defined. The reaction may be carried out with or without a solvent in the presence of an acid-binding agent, such as an alkali metal derivative or a tertiary amine, and at a temperature between 0° and 150° C. When a solvent is employed, it is preferably an aromatic hydrocarbon such as benzene or toluene.

The racemic and optically active D forms of the carbamic esters of the present invention have remarkable selective herbicidal properties. They can be used to destroy weeds, more especially grasses, such as wild oats (*Avena fatua*), perennial rye grass (*Lolium perenne*), Echinochloa (*Echinochloa crusgalli*), Setaria (*Setaria faberii*), Digitaria (*Digitaria sanguinalis*) and foxtail (*Alopecurus pratensis*) amongst crops such as onion, radish, rapeseed, mustard, cress, beet, lucerne, clover, broad bean, French bean, pea, lentil, carrot and sunflower without damage to the crop at normal doses required to destroy the weeds. The doses required vary in accordance with the nature of the plant(s) to be destroyed and the desired effect. In general, taking into account these two factors, doses of active material of 0.250 to 10 kg. per hectare give good results. Compounds of outstanding importance are those of Formula I in which $R_1$ represents a methyl, ethyl or isopropyl group. Of particular importance are 2-(3-chlorophenylcarbamoyloxy)-N-methylpropionamide,
2-phenylcarbamoyloxy-N-methylpropionamide,
D(—)2-(3-chlorophenylcarbamoyloxy)-N-methylpropionamide,
D(—)2-(3-chlorophenylcarbamoyloxy)-N-ethylpropionamide,
D(—)2-phenylcarbamoyloxy-N-methylpropionamide,
D(—)2-phenylcarbamoyloxy-N-ethylpropionamide,
D(—)2-(3-chlorophenylcarbamoyloxy)-N-isopropylpropionamide, and
D(—)2-(phenylcarbamoyloxy)-N-isopropylpropionamide.

According to a further feature of the present invention, there are provided herbicidal compositions containing at least one carbamic ester of general Formula I in association with one or more diluents compatible with the carbamic ester or esters and suitable for use in herbicidal compositions. Preferably the compositions contain between 0.005 and 50% by weight of carbamic ester. The compositions may be solid if there is employed a powdered solid compatible diluent such as talc, calcined magnesia, kieselguhr, tricalcium phosphate, powdered cork, absorbent carbon black or a clay such as kaolin or bentonite. Instead of a solid diluent, there may be used a liquid in which the carbamic ester is dissolved or dispersed. The compositions may thus take the form of aerosols, suspensions, emulsions or solutions in organic or aqueous organic media, for example aromatic hydrocarbons such as toluene or xylene or mineral, animal or vegetable oils, or mixtures of these diluents. The compositions in the form of dispersions, solutions or emulsions may contain wetting, dispersing or emulsifying agents of the ionic or non-ionic type, for example sulphoricinoleates, quaternary ammonium derivatives or products based on condensates of ethylene oxide, such as the condensates of ethylene oxide with octylphenol, or fatty acid esters of anhydrosorbitols which have been rendered soluble by etherification of the free hydroxyl groups by condensation with ethylene oxide. It is preferable to use agents of the non-ionic type because they are not sensitive to electrolytes. When desired, the emulsions of the carbamic esters may be used in the form of self-emulsifying concentrates containing the active substance dissolved in the dispersing agent or in a solvent containing a dispersing agent compatible with the active ester, a simple addition of water producing compositions ready for use.

The solid compositions are preferably prepared by grinding the carbamic ester with the solid diluent, or by impregnating the solid diluent with a solution of the carbamic ester in a volatile solvent, evaporating the solvent and, if necessary, grinding the product so as to obtain a powder.

The following examples illustrate the invention.

EXAMPLE I

To a solution of 2,4-dichlorophenyl isocyanate (15.5 g.) in benzene (40 cc.) is added N-methyl-lactamide (8.5 g.), and the mixture is refluxed for 4 hours. During the course of cooling a precipitate forms, which is separated and washed with benzene (2 x 10 cc.). After drying in vacuo, there is obtained 2-(2,4-dichlorophenylcarbamoyloxy)-N-methylpropionamide (21 g.). On recrystallisation from benzene, the product melts at 145° C.

EXAMPLE II

To a solution of 3-chlorophenyl isocyanate (15.3 g.) in benzene (40 cc.) is added N-methyl-lactamide (10.3 g.), and the mixture is heated under reflux for 4 hours. The reaction mixture is treated with decolorising charcoal and then concentrated under reduced pressure. The residual oil crystallises on cooling. After recrystallisation from 50% (v./v.) ethanol, there is obtained 2-(3-chlorophenylcarbamoyloxy)-N-methylpropionamide (10 g.), M.P. 126–127° C.

EXAMPLE III

To a solution of 3-chlorophenyl isocyanate (21 g.) in benzene (40 cc.) is added N-ethyl-lactamide (16 g.), and the mixture is refluxed for 4 hours. During the course of cooling an abundant precipitate forms and, after filtration, the solid is recrystallised from 50% (v./v.) ethanol (40 cc.). There is thus obtained 2-(3-chlorophenylcarbamoyloxy)-N-ethylpropionamide (11 g.), M.P. 128° F.

EXAMPLE IV

To a solution of phenyl isocyanate (23.8 g.) in benzene (75 cc.) is added N-methyl-lactamide (20.6 g.), and the mixture is heated under reflux for 5 hours. During the course of cooling a product crystallises. The precipitate is separated and ground in water (250 cc.). There is obtained 2 - phenylcarbamoyloxy-N-methylpropionamide (36 g.), M.P. 122° C. On recrystallisation from water, the melting point remains unchanged.

EXAMPLE V

To a solution of phenyl isocyanate (23.8 g.) in benzene (75 cc.) is added N-ethyl-lactamide (23.4 g.). After standing for 20 minutes at room temperature, the mixture is refluxed for 4 hours. After cooling, the benzene is driven off and the residual oil is taken up in water (150 cc.). The product is filtered off and dried in vacuo over sulphuric acid. On recrystallisation from a mixture of ethyl acetate and petroleum ether (1 vol.:3 vol.), there is obtained 2-phenylcarbamoyloxy-N-ethylpropionamide (19 g.), M.P. 116° C.

The isocyanate starting materials employed in Examples I to V are prepared by the method of Vittenet, Bull. Soc. Chim. 21, 586 and 954 (1899). The substituted lactamide starting materials are prepared in accordance with Ratchford, Org. Chem. 15, 326 (1950), and Ratchford and Fischer, J. Am. Chem. Soc. 69, 1913 (1947).

EXAMPLE VI

To a solution of 4-chlorophenyl isocyanate (15.3 g.) in benzene (40 cc.) is added N-methyl-lactamide (10.3 g.), and the mixture is heated under reflux for 4 hours. The reaction mixture is treated with decolorising charcoal and then concentrated under reduced pressure. The residual oil crystallises on cooling. After recrystallisation from 50% (v./v.) ethanol, there is obtained 2-(4-chlorophenylcarbamoyloxy)-N-methylpropionamide (10 g.), M.P. 135° C.

By proceeding in a similar manner and starting with appropriate phenyl isocyanates and hydroxyamides conforming to Formula II, there were obtained the following products:

2-(3,4-dichlorophenylcarbamoyloxy)-N-methylpropionamide, M.P. 158° C.;
2-(4-chlorophenylcarbamoyloxy)-N-ethylpropionamide, M.P. 155° C.;
2-(3,4-dichlorophenylcarbamoyloxy)-N-ethylpropionamide, M.P. 162° C.;
2-(2,5-dichlorophenylcarbamoyloxy)-N-methylpropionamide, M.P. 164° C.

EXAMPLE VII

A mixture of D(+)N-methyl-lactamide (23 g.) and 3-chlorophenyl isocyanate (30.7 g.) in benzene (100 cc.) is heated under reflux for 7 hours. After cooling, the solid formed is taken up in distilled water (200 cc.). After drying in vacuo over sulphuric acid and recrystallisation from 50% (v./v.) ethanol, there is obtained D(−)2 - (3 - chlorophenylcarbamoyloxy) - N - methylpropionamide (41 g.), M.P. 157–158° C.;

$$[\alpha]_D^{23} = -17.8°$$

(c.=10.0, dimethylformamide).

D(+)N-methyl-lactamide employed as starting material is prepared from D(+)ethyl-lactate. Its rotatory power is $[\alpha]_D^{23} = +26.5°$ (c.=5, water).

EXAMPLE VIII

A mixture of 3-chlorophenyl isocyanate (61.2 g.) and D(+)N-ethyl-lactamide (50 g.) in benzene (250 cc.) is heated under reflux for 6 hours. After cooling, the benzene is driven off under reduced pressure, and the residual oil is taken up in water. A solid crystallises. After drying, there is obtained D(—)2-(3-chlorophenyl-carbamoyloxy)-N-ethylpropionamide (75 g.), M.P. 98–100° C. Its rotatory power is $[\alpha]_D^{23} = -18°$ (c.=10.0, dimethylformamide).

The D(+)N-ethyl-lactamide is prepared from D(+)-ethyl - lactate. Its rotatory power is $[\alpha]_D^{23} = +18°$ (c.=10.0, water).

EXAMPLE IX

A mixture of phenyl isocyanate (47.6 g.) and D(+)N-methyl-lactamide (44 g.) [[$\alpha]_D^{23} = +26.5°$ (c.=5.0, water)] in benzene (150 cc.) is heated under reflux for 6 hours. After cooling a precipitate forms which is ground in a mortar with water. After drying and recrystallisation from ethanol, there is obtained D(—)2-phenylcarbamoyloxy-N-methylpropionamide (57 g.), M.P. 130° C. Its rotatory power is $[\alpha]_D^{23} = -23.5°$ (c.=10, dimethylformamide).

EXAMPLE X

To a solution of phenyl isocyanate (42 g.) in benzene (110 cc.) is added D(+) ethyl-lactamide (40 g.). After heating under reflux for 6 hours the product is allowed to cool. After treatment as described in Example IX, there is obtained D(—)2-phenylcarbamoyloxy-N-ethylpropionamide (49 g.), M.P. 118° C. Its rotatory power is $[\alpha]_D^{25} = -23.5°$ (c.=10, dimethylformamide).

EXAMPLE XI

A mixture of 3-chlorophenyl isocyanate (23 g.) and D(+)N-isopropyl-lactamide (21.6 g.) [[$\alpha]_D^{23} = +13°$ (c.=10, water)] in benzene (75 cc.) is heated under reflux for 7 hours. After cooling, the precipitate formed is separated and ground in a mortar with water. D(—)2-(3-chlorophenylcarbamoyloxy)-N-isopropylpropionamide (35.5 g.) is obtained after drying and recrystallisation from benzene, M.P. 100° C., rotatory power $[\alpha]_D^{23} = -19°$ (c.=10, dimethylformamide).

EXAMPLE XII

A mixture of 3-chlorophenyl isocyanate (15.3 g.) and D(+)N-butyllactamide (16 g.) in benzene (50 cc.) is heated under reflux for 8 hours. After cooling a crystalline precipitate forms which is separated. The solid obtained is ground in a mortar with water (200 cc.). After drying, a product (22 g.) is obtained which, on recrystallisation from benzene, gives D(—)2-(3-chlorophenylcarbamyloxy)-N-butylpropionamide (18 g.), M.P. 52° C.

D(+)N-butyl-lactamide [B.P. 130–132° C./0.5 mm. Hg, $[\alpha]_D^{23} = +13°$ (c.=10, water)] is prepared by reacting butylamide with D(+)ethyl-lactate [[$\alpha]_D^{23} = +11.6°$ (without solvent)].

EXAMPLE XIII

A mixture of phenyl-isocyanate (23.8 g.) and D(+)N-isopropyl-lactamide (28.8 g.) [$\alpha]_D^{23} = +16.3°$ (c.=5, water) in benzene (60 cc.) is heated under reflux for 7½ hours. After cooling, the precipitate formed is separated and ground in a mortar with water (500 cc.). D(—)2-phenylcarbamoyloxy-N-isopropylpropionamide (33 g.) is obtained after drying and recrystallisation from 50% (v./v.) ethanol, M.P. 120° C., rotatory power $$[\alpha]_D^{22} = -30°$$

(c.=5, dimethylformamide).

The following Examples XIV to XVII, in which parts are parts by weight, illustrate herbicidal compositions according to the invention. The compositions may be used, after dilution with water to give 0.005 to 50% by weight of ester, to destroy, for example, foxtail among rapeseed, Setaria among lucerne and Digitaria among clover.

EXAMPLE XIV 2-(3-chlorophenylcarbamoyloxy)-N-methylpropionamide (10 parts) (prepared as described in Example II) is dissolved in acetophenone (90 parts), and a condensate (10 parts) of ethylene oxide with octylphenol, the condensate containing 10 molecules of ethylene oxide per molecule of octylphenol, is added to the solution.

EXAMPLE XV

By intimately grinding 2-(3-chlorophenylcarbamoyloxy)-N-ethylpropionamide (50 parts) with talc (40 parts) and a wetting agent based on the sodium salt of the sulphonation products of dodecylbenzene (10 parts), there is obtained a fine powder which can readily be suspended in water.

EXAMPLE XVI

To D(—)2-(3-chlorophenylcarbamoyloxy - N - ethylpropionamide (25 g.) (prepared as described in Example VIII) is added a condensate (5 g.) of ethylene oxide with octylphenol, the condensate containing 10 molecules of ethylene oxide per molecule of octylphenol, and the solution thus obtained is made up to 100 cc. with toluene.

EXAMPLE XVII

To D(—)2-phenylcarbamoyloxy-N-ethylpropionamide (50 g.) is added talc (45 g.) and a condensate (5 g.) of ethylene oxide with octylphenol, and the product is ground in a ball mill to a powder which can readily be suspended in water.

The herbicidal activity of the compounds of general Formula I, of the present invention, as compared with prior art compounds, those of the closest chemical structure having been selected for comparison, is shown by the following results of practical tests. The products compared have the Formula VI:

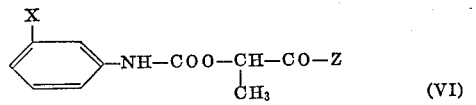

with differing values of X and Z as noted in the table of results which follows. The tests used are the following:

(1) *Inhibition of the growth of barley roots*

Barley seeds (Aurora variety) are placed on moist cotton for germination for 24 hours. The roots are then 5±2 mm. in length. These germinated barley seeds are then placed, 35 per dish, into Petri dishes 14.5 cm. in diameter, each containing 30 cc. of a solution with the desired concentration of the product to be tested. Three days later, the length of each main root is measured. The mean length of the 30 longest main roots is then determined and compared with the mean length of the main roots of the comparative seeds, which were placed in twice-distilled water. The ratio between the length of the roots of the seeds treated and that of the comparison seeds is determined.

(2) *Test of pre-emergence in a glasshouse*

Seeds of three germinated species: wheat (*Triticum vulgaris*), wild oats (*Avena fatua*) and rye grass (*Lolium perenne*) are sown in a predetermined number in pots of plastic material having a capacity of 18 cc., on the surface of a soil composed of a mixture in equal parts of vegetable earth and screened Seine sand. 1 cc. of a solution of the products to be tested is sprinkled on each pot. The seeds are thereafter covered with an untreated soil and germinated under fluorescent tubes for 20 days. The mean number and height of the plants in each pot are then measured and compared with the comparative specimens (which have received twice-distilled water). The ratios between the number and height of the plants grown under the treated soil and those of the comparison plants are determined. Three pots of a particular species are used per concentration.

The results are given in the following table:

2. D(—)2-(3-chlorophenylcarbamoyloxy) - N - ethylpropionamide.
3. D(—)2 - phenylcarbamoyloxy - N - methylpropionamide.

TABLE

| No. | No. Ex. | X | Z | Form | Inhibition of the Growth of Barley Roots in Percentage | | | | Test of Pre-emergence in a Glasshouse | | | |
|---|---|---|---|---|---|---|---|---|---|---|---|---|
| | | | | | | | | | Wheat | | | |
| | | | | | 0.1 mg./l. | 0.33 mg./l. | 1 mg./l. | 3.3 mg./l. | 0.125 mg./l. | | 0.25 mg./l. | |
| | | | | | | | | | No., percent | Height, percent | No., percent | Height, percent |
| | | | | | Products of the present invention | | | | | | | |
| 1 | IV | H | —NHCH₃ | Rac. | 109 | 108 | 73 | 21 | 28 | 42 | 0 | 0 |
| 2 | IX | H | —NHCH₃ | D | 101 | 103 | 28 | 0 | 4 | 20 | 0 | 0 |
| 3 | X | H | —NHC₂H₅ | D | 101 | 98 | 25 | 0 | 0 | 0 | 0 | 0 |
| 4 | II | Cl | —NHCH₃ | Rac. | 97 | 25 | 0 | 0 | 13 | 21 | 0 | 0 |
| 5 | VII | Cl | —NHCH₃ | D | 0 | 0 | 0 | 0 | 0 | 0 | 0 | 0 |
| 6 | III | Cl | —NHC₂H₅ | Rac. | 0 | 0 | 0 | 0 | 17 | 40 | 0 | 0 |
| 7 | VIII | Cl | —NHC₂H₅ | D | 0 | 0 | 0 | 0 | 0 | 0 | 0 | 0 |
| 8 | XI | Cl | —NHCH(CH₃)₂ | D | 0 | 0 | 0 | 0 | 0 | 0 | 0 | 0 |
| 9 | XII | Cl | —NHC₄H₉(n) | D | 0 | 0 | 0 | 0 | 9 | 11 | 0 | 0 |
| | | | | | Products described by Mitchell et al, Science 120, 263–265 (August 13, 1954) (Acids) | | | | | | | |
| 10 | | H | —OH | Rac. | 102 | 101 | 97 | 84 | 100 | 105 | 98 | 101 |
| 11 | | Cl | —OH | Rac. | 108 | 109 | 84 | 56 | 96 | 102 | 43 | 94 |
| | | | | | D-Isomer of the unsubstituted amide described in British Patent No. 789,445 | | | | | | | |
| 12 | | Cl | —NH₂ | D | 107 | 36 | 0 | 0 | 50 | 52 | 9 | 24 |

| No. | No. Ex. | X | Z | Form | Test of Pre-emergence in a Glasshouse | | | | | | | | | |
|---|---|---|---|---|---|---|---|---|---|---|---|---|---|---|
| | | | | | Wild Oats | | | | Rye Grass | | | | | |
| | | | | | 0.125 mg./l. | | 0.25 mg./l. | | 0.125 mg./l. | | 0.25 mg./l. | | 0.5 mg./l. | |
| | | | | | No., percent | Height, percent | No., percent | Height, percent | No., percent | Height, percent | No., percent | Height, percent | No., percent | Height, percent |
| | | | | | Products of the present invention | | | | | | | | | |
| 1 | IV | H | —NHCH₃ | Rac. | 106 | 97 | 0 | 0 | 87 | 86 | 26 | 72 | 0 | 0 |
| 2 | IX | H | —NHCH₃ | D | 29 | 40 | 0 | 0 | 41 | 72 | 0 | 0 | 0 | 0 |
| 3 | X | H | —NHC₂H₅ | D | 0 | 0 | 0 | 0 | 18 | 45 | 4 | 42 | 0 | 0 |
| 4 | II | Cl | —NHCH₃ | Rac. | 30 | 10 | 0 | 0 | 17 | 52 | 0 | 0 | 0 | 0 |
| 5 | VII | Cl | —NHCH₃ | D | 0 | 0 | 0 | 0 | 0 | 0 | 0 | 0 | 0 | 0 |
| 6 | III | Cl | —NHC₂H₅ | Rac. | 18 | 32 | 0 | 0 | 6 | 45 | 0 | 0 | 0 | 0 |
| 7 | VIII | Cl | —NHC₂H₅ | D | 0 | 0 | 0 | 0 | 0 | 0 | 0 | 0 | 0 | 0 |
| 8 | XI | Cl | —NHCH(CH₃)₂ | D | 0 | 0 | 0 | 0 | 0 | 0 | 0 | 0 | 0 | 0 |
| 9 | XII | Cl | —NHC₄H₉(n) | D | 83 | 17 | 0 | 0 | 9 | 24 | 0 | 0 | 0 | 0 |
| | | | | | Products described by Mitchell et al, Science 120, 263–265 (August 13, 1954) (Acids) | | | | | | | | | |
| 10 | | H | —OH | Rac. | 100 | 105 | 100 | 100 | 89 | 100 | 100 | 100 | 90 | 92 |
| 11 | | Cl | —OH | Rac. | 100 | 98 | 100 | 73 | 97 | 103 | 83 | 93 | 101 | 83 |
| | | | | | D-Isomer of the unsubstituted amide described in British Patent No. 789,445 | | | | | | | | | |
| 12 | | Cl | —NH₂ | D | 105 | 85 | 24 | 22 | 50 | 83 | 50 | 76 | 10 | 48 |

This application is a continuation-in-part of application Serial No. 68,603 filed November 14, 1960, and now abandoned.

I claim:

1. Carbamic esters selected from the class consisting of the racemic and optically active D forms of carbamic esters of the formula:

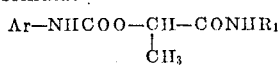

wherein Ar is a member selected from the class consisting of phenyl and chloro-substituted phenyl and R₁ represents and alkyl group of 1 to 4 carbon atoms.

4. D(—)2-phenylcarbamoyloxy-N-ethylpropionamide.
5. D(—)2-phenylcarbamoyloxy - N - isopropylpropionamide.
6. D(—)2 - (3 - chlorophenylcarbamoyloxy)-N-isopropylpropionamide.
7. A herbicidal composition comprising a carbamic ester selected from the group consisting of racemic and optically active D forms of carbamic esters of the formula:

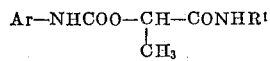

wherein Ar is a member selected from the class consisting of phenyl and chloro-substituted phenyl and $R_1$ represents an alkyl group of 1 to 4 carbon atoms, in association with an inert diluent compatible with the said ester, the quantity of said carbamic ester being between 0.005 and 50% by weight of the composition.

8. A herbicidal composition according to claim 7, which contains an inert surface active agent.

9. A herbicidal composition according to claim 7, which contains an inert non-ionic surface-active agent.

No references cited.